July 3, 1956 — F. M. HOM — 2,753,552
APPARATUS FOR PRODUCING A CONTINUOUSLY MOVING MAP
Filed Dec. 18, 1951 — 2 Sheets-Sheet 1

INVENTOR.
FREEMAN M. HOM
BY William R. Lane
ATTORNEY

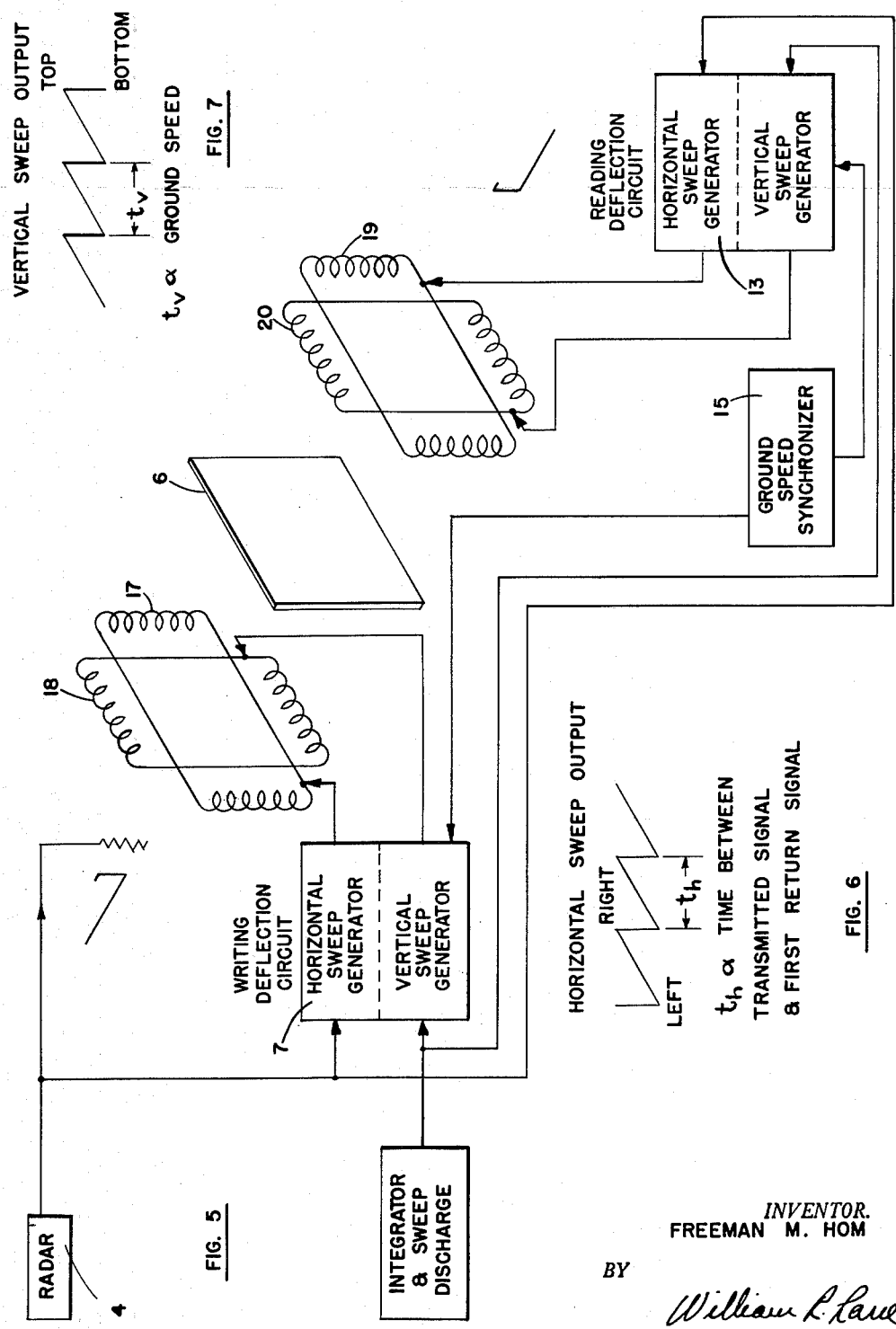

_United States Patent Office_

2,753,552
Patented July 3, 1956

2,753,552
APPARATUS FOR PRODUCING A CONTINUOUSLY MOVING MAP

Freeman M. Hom, Redwood City, Calif., assignor to North American Aviation, Inc.

Application December 18, 1951, Serial No. 262,285

5 Claims. (Cl. 343—11)

This invention refers to an apparatus for providing a continuously moving map and more particularly to an all electronic apparatus for producing a continuously moving map while carried by a moving vehicle.

An object of this invention is to provide a moving map in terms of an electric charge.

Another object of this invention is to provide a map in a moving vehicle coordinated with the velocity of the vehicle.

A further object of this vehicle is to provide a moving map that may be utilized to produce a useable voltage as the map is written.

Still another object of this invention is to provide a map from a fixed antenna radar obviating the necessity of a scanning antenna.

These and other objects will become apparent from the following detailed description taken in connection with the accompanying drawings in which:

Fig. 5 is a detailed view which includes the means for shifting the reading and writing beams.

Fig. 6 is a graphical representation of the output of the horizontal sweep.

Fig. 7 is a graphical representation of the vertical sweep output.

Figure 1:
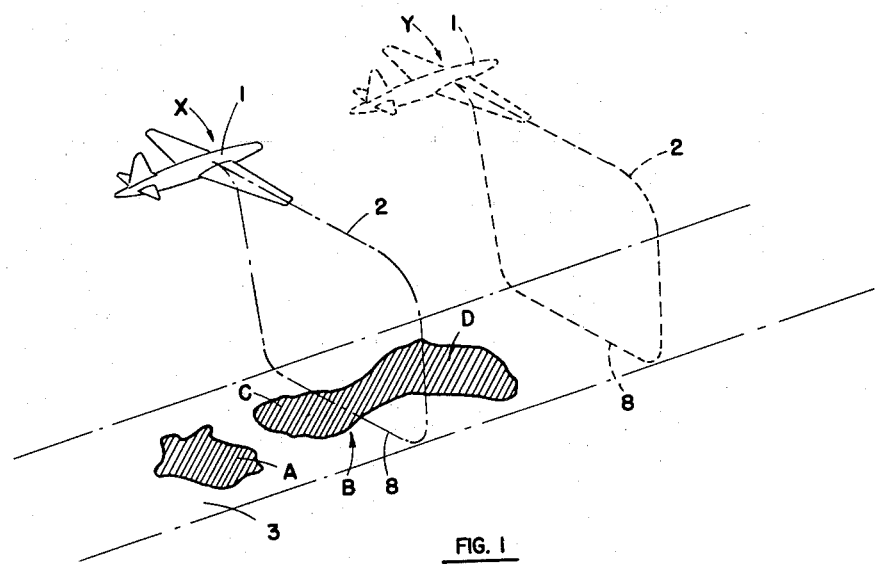
Fig. 1 is a perspective view showing terrain covered by a vehicle in making a map.
Figure 2:
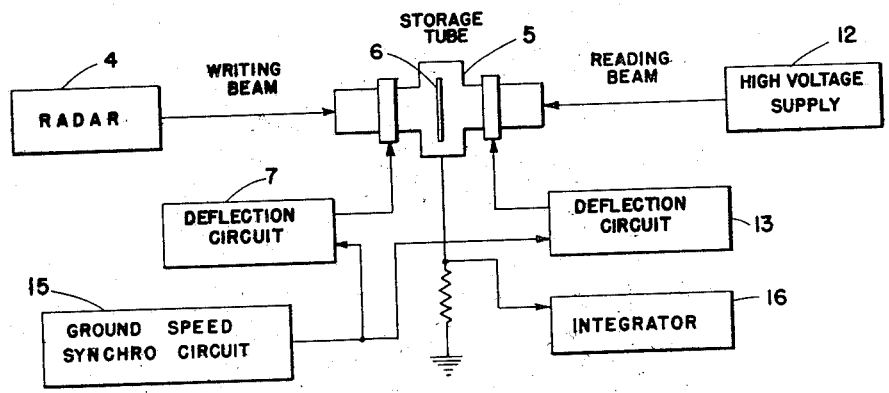
Fig. 2 is a diagram of the apparatus for providing a map.

A moving vehicle, such as an aircraft 1, is provided with a radar device having a fixed non-scanning antenna. This type of radar apparatus provides a fan shaped beam 2 which, as shown in Fig. 1, contacts an elongated narrow strip 8 of the terrain below the airplane. As the airplane progresses in flight the radar beam progressively moves across the terrain below along path 3. Referring now to Fig. 2, radar 4 is connected with a graphecon storage tube 5 which is provided with a storage plate 6. A suitable deflection circuit 7 is connected with the graphecon tube so that the radar acts as a writing beam which progressively inscribes on storage plate 6 a map defined in terms of a pattern of varying electric charge representing what radar beam 2 has detected. A storage tube of this sort is conventional and a more detailed description of an arrangement of this type may be found in RCA Review, March 1949, volume 10, No. 1, pages 59–73. As the writing beam progresses across the storage plate energy reflected from more distant objects will take a greater length of time to return to the radar than for closer objects, resulting in a pattern of varying electrical charge as the beam moves across the plate. This is because the radar unit is provided with a fixed type antenna producing a relatively narrow fan-shaped beam. At any given instant this beam contacts a narrow strip below the airplane and the energy reflected from the portions some distance from the aircraft will require a longer time to return than those reflected from portions closer to the aircraft. This time differential is a function of the difference in distances and results in the pattern of varying charge as the writing beam moves across the storage plate. Thus, if the writing beam moves from left to right across the storage plate, for example, portions of the ground nearer to the aircraft which are contacted by the radar beam will be recorded on the storage plate to the left portion thereof. Those portions farthest from the airplane require greater time to return so that the reflected energy will be recorded toward the right-hand side of the storage plate. Objects on the ground will show up as increased charge due to the increased reflectivity when objects are contacted by the fan-shaped beam. This is in accordance with conventional radar characteristics. Thus at a given instant radar beam 2 picks up a small portion of the terrain below the airplane. This narrow strip is then recorded by the writing beam on the storage plate which, by means of deflection circuit 7, may be positioned to record the information at bottom edge 9 of the storage plate. As the airplane proceeds, additional information is picked up by the radar and inscribed on the storage plate just above the first line, and so on progressively until the writing beam reaches top edge 10 of the storage plate. This operation may be seen by reference to Figs. 1 and 3. When the airplane has moved along path 3 to position X of Fig. 1, the radar has recorded on the storage plate a map of the terrain covered in terms of electric charge as the airplane progressed. Area A, which may be, for example, a body of water passed over by the airplane, is indicated on the storage plate, and area B has begun to appear on the storage plate, portion C of this area having been recorded. Thus the storage plate will contain a record of an area that has just been covered by the radar beam, while the writing beam is inscribing the terrain instantaneously contacted by radar beam 2.

Figure 3:
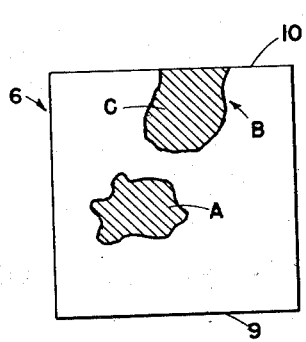
Fig. 3 is a view of the storage plate at one position of the vehicle.

When the storage plate is full, as in Fig. 3, the writing beam having reached top edge 10, deflection circuit 7 automatically repositions the writing beam so that it will next record again near the bottom edge of the storage plate. This may be accomplished in any suitable manner. Deflection circuit 7, for example, may include an integrator which builds up a charge as the writing beam moves upward from edge 9 toward edge 10 of the storage plate. The amount of voltage required to move the writing beam to the top edge of the storage plate may be a predetermined value, and when this charge has been reached the integrator may be arranged to automatically discharge and reposition the writing beam to the bottom edge of the storage plate for the next cycle.

Included in the apparatus and connected with the graphecon tube on the opposite side from the radar is a reading beam supply 12 which is also provided with a suitable deflection circuit 13. The reading beam scans the storage plate in a manner well known in the art so as to remove the information placed thereon by the writing beam. Synchronizer 15 is connected with deflection circuit 7 and deflection circuit 13 to coordinate the action of the writing beam and the reading beam. Synchronizer 15 may employ a conventional velocity indicator as described in detail on pages 72 through 74 of "Principles of Aerodynamics" by Dwinnell, McGraw-Hill Book Company, Inc., 1949. In its simplest form, and when the device is employed in a piloted aircraft, the speed indication can be noted by the pilot whereby he can accordingly vary the sweep rate of the deflection circuits in the conventional manner as with any television set. For automatic operation the speed indicating take-off may be connected to the rotor of a synchro motor, the output of which can be used to drive a synchro follow-up connected with a potentiometer for providing an electrical signal to be used in varying the sweep rate. For a description of a synchro operation see page 237, Fig. 6–IV, of the section on Synchros and Servo Systems in "The Electronic Control Handbook" by Batcher and Moulic, Caldwell-Clemens, Inc., 1946. As a still further means of providing an electrical signal corresponding to the speed of the vehicle, the differential pressure fittings illustrated in "Principles of Aerodynamics" may be hooked to a pressure transducer such as that described in Bulletin No. 3.3 published by the Statham Laboratories, 9328 Santa Monica Boulevard, Beverly Hills, California, dated August 20, 1950. All of these features are conventional and well-known in the art. By this means the reading beam is made to scan the storage plate just ahead of the writing beam. No special circuitry is necessary to properly synchronize the writing and reading beams, it being necessary merely to mechanically position the yokes of the deflection circuits with respect to the storage tube so that for a given instantaneous value of current the reading beam is separated from and precedes the writing beam by a few picture elements. When the writing beam is returned to the bottom edge of the storage plate the reading beam will have immediately preceding that time removed the charge that the writing beam had previously inscribed on the bottom portion of the storage plate. As the writing beam proceeds across the storage plate the reading beam will progressively erase the electric charge from the plate just prior to contact by the writing beam. Thus the reading beam removes the oldest information on the map and allows the writing beam to record the new information in the area left blank by the action of the reading beam. In this manner the writing beam may continuously move from one edge of the storage plate to the other inscribing new information thereon as the aircraft proceeds, while the reading beam will remove the old information falling outside the range of the storage plate map. This procedure is followed over and over again as the new map continuously moves up the storage plate and begins again at the bottom of the storage plate after the storage plate has been filled.

Figure 4:
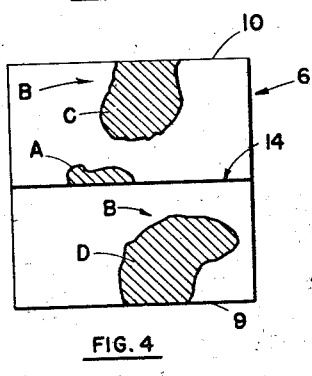
Fig. 4 is a view of the storage plate at another position of the vehicle.

Fig. 4 illustrates the storage plate after the airplane has proceeded further along the path 3 to position Y. The oldest information, formerly recorded near the bottom of the storage plate and including part of area A, has been removed by the reading beam and new information has been inscribed in its place by the writing beam. Portion D of area B, which could not be recorded at the top of the storage plate because the limits of the plate had been reached by the writing beam, now appears near the bottom of the plate just above edge 9. Thus the storage plate retains the oldest information recorded by the writing beam just above position 14 where the reading beam has scanned the storage plate. The newest information representing the instantaneous position of the vehicle is recorded by the writing beam just below position 14 leaving a very narrow gap between the writing beam and the reading beam.

The action of the writing beam and the reading beam should be coordinated with the velocity of the vehicle so that the map will be recorded and read at a rate corresponding to the rate at which the vehicle passes over the terrain. Thus synchronizer 15 should include a suitable ground speed indicator to coordinate the speed of the aircraft with the rate at which the information is written and read.

The operation of the deflection circuits may be seen by reference to Fig. 5. As illustrated in this figure the writing portion of the graphecon tube is provided with two yokes for deflecting the writing beam to cause it to scan storage plate 6. These comprise horizontal deflection yoke 17 which causes the writing beam to scan the storage plate horizontally, and vertical deflection yoke 18 which results in the vertical movement of the writing beam. The horizontal sweep generator provides an output as illustrated in which deflection of the writing beam from left to right is effected during the upwardly sloping portion of the saw tooth curve in a period which is proportional to the time between the transmitted signal and the first return signal to the radar. The vertical sweep generator also has a saw tooth shaped output which causes the beam to rise from the bottom to the top of the storage plate in a period of time proportionate to the ground speed of vehicle 1. Similarly, yokes 19 and 20 are provided for the reading beam.

The information written on the storage plate in the form of a continuously moving map may be utilized in any desired manner. In one use of such a map on the storage plate the reading beam is modulated in accordance with a pattern of light and dark areas on a reference map so as to remove only portions of the radar map on one scanning cycle, and is arranged to again scan the storage plate before new information is inscribed thereon by the writing beam to remove the remaining charge which is a function of the amount of mismatch between the radar map and the reference map. This remaining charge may be fed to an integrator 16 where it becomes a useable voltage. The integrator 16 is of conventional type such as that described on pages 158 through 161 of "Electron Tube Circuits" by Seely, McGraw-Hill Book Company, Inc., 1950.

The foregoing detailed description is to be clearly understood as by way of illustration only and not by way of limitation, the spirit and scope of this invention being limited only by the appended claims.

I claim:

1. An apparatus for obtaining a continuously moving map from a moving vehicle comprising an electronic storing means carried by said vehicle, said storing means including a storage plate; a non-scanning radar device carried by said vehicle; means interconnected with and controlled by said radar for providing a writing beam to progressively record information from one side to the other of said storage plate; means for shifting said writing beam from the top to the bottom of said storage plate when the limits of said storage plate are reached, for thereby allowing continuously progressive movement of said writing beam; means for removing recorded information from said storage plate immediately preceding recontact by said writing beam; and means for coordinating said writing beam and said means for removing recorded information with the velocity of said vehicle.

2. An apparatus for producing a continuously moving map comprising a moving vehicle; a radar device carried by said vehicle, said radar being provided with a non-scanning antenna having a relatively narrow beam; a graphecon tube, said tube having a storage plate; means whereby said radar progressively records information on said storage plate in a series of repeated cycles; means for removing information previously recorded thereon immediately prior to such recording by said radar and synchronizer means for coordinating the operation of said means for recording information and said means for removing information with the speed of said vehicle.

3. An apparatus for providing a continuously moving map from a moving vehicle comprising a radar carried by said vehicle, said radar being provided with a fixed antenna providing a relatively narrow fan-shaped beam; a graphecon tube, said tube including a storage plate; means interconnecting said radar and said graphecon tube whereby said radar provides a writing beam progressively inscribing on said storage plate in terms of electric charge a map of the area traversed by said vehicle, said writing beam thereby scanning said storage plate from one side to the other; means for repositioning said writing beam for allowing continuous scanning thereof across said storage plate; means for removing the oldest information retained on said storage plate immediately prior to contact by said writing beam, and synchronizer means for coordinating the operation of said writing beam and said means for removing information from said storage plate with the velocity of said vehicle.

4. An apparatus for obtaining a continuously moving map from a moving vehicle comprising a graphecon tube carried by said vehicle, said tube including a storage plate; a radar device, said radar being provided with a non-scanning antenna producing a fan-shaped beam adapted to cover an elongated narrow strip of area; said radar being interconnected with said graphecon tube thereby providing a writing beam for recording information on said storage plate in terms of relative intensity of electric charge; a deflection circuit for causing said writing beam to progressively scan said storage plate from one edge to the opposite edge thereof for recording a map thereon, said deflection circuit being operative when said writing beam reaches said opposite edge for shifting said writing beam back to said first mentioned edge for repetition of the scanning cycle; reading beam means connected with said graphecon tube; a second deflection circuit operative to cause said reading beam means to progressively scan said storage plate and remove said electric charge immediately prior to contact by said writing beam; and synchronizer means for coordinating the operation of said writing beam and said reading beam with the velocity of said vehicle.

5. A device as recited in claim 4 including in addition an integrator for producing a voltage in accordance with the charge removed from said storage plate.

References Cited in the file of this patent

UNITED STATES PATENTS

| | | |
|---|---|---|
| 2,403,562 | Smith | July 9, 1946 |
| 2,430,307 | Smith | Nov. 4, 1947 |
| 2,524,295 | Mesner | Oct. 3, 1950 |
| 2,655,650 | Marshall | Oct. 13, 1953 |